United States Patent
Parladori et al.

(10) Patent No.: US 9,372,753 B2
(45) Date of Patent: Jun. 21, 2016

(54) PROTECTION AGAINST A FAILURE IN A COMPUTER NETWORK

(75) Inventors: Giorgio Parladori, Milan (IT); Pasquale Donadio, Naples (IT)

(73) Assignee: Alcatel Lucent, Boulogne-Billancourt (FR)

(*) Notice: Subject to any disclaimer, the term of this patent is extended or adjusted under 35 U.S.C. 154(b) by 179 days.

(21) Appl. No.: 14/116,224

(22) PCT Filed: Jun. 22, 2012

(86) PCT No.: PCT/EP2012/062083
§ 371 (c)(1),
(2), (4) Date: Nov. 7, 2013

(87) PCT Pub. No.: WO2013/000831
PCT Pub. Date: Jan. 3, 2013

(65) Prior Publication Data
US 2014/0195849 A1    Jul. 10, 2014

(30) Foreign Application Priority Data
Jun. 27, 2011   (EP) .................... 11305817

(51) Int. Cl.
*G06F 11/00* (2006.01)
*G06F 11/14* (2006.01)
(Continued)

(52) U.S. Cl.
CPC ........ *G06F 11/1415* (2013.01); *G06F 11/0709* (2013.01); *G06F 11/0793* (2013.01);
(Continued)

(58) Field of Classification Search
CPC ............ G06F 11/0709; G06F 11/0793; G06F 11/3006; G06F 11/3051; G06F 11/0672
See application file for complete search history.

(56) References Cited

U.S. PATENT DOCUMENTS 5,526,414 A   6/1996   Bedard et al.
6,400,681 B1  6/2002   Bertin et al.
(Continued)

FOREIGN PATENT DOCUMENTS

CN   1606277   4/2005
EP   1473887   11/2004
(Continued)

OTHER PUBLICATIONS

Lai, W. et al; RFC3386: Network Hierarchy and Multilayer Survivability; Internet Citation; Nov. 7, 2002; pp. 1-27; XP002239553; retrieved from the Internet: URL:www.ietf.org/rfc/rfc3386.txt?number=3386; [retrieved on Apr. 28, 2003].

*Primary Examiner* — Jason Bryan
(74) *Attorney, Agent, or Firm* — Patti & Malvone Law Group, LLC (57) ABSTRACT

It is disclosed a method for protecting a computer network against a failure. The method comprises: identifying a number of possible failures which might occur within the computer network, the number of possible failures comprising at least one possible failure; and, based on detected availability of resources in the computer network, determining a protection state of the computer network allowing to circumvent the possible failure and dynamically updating the determined protection state based on changes of the detected availability. The method further comprises, upon occurrence of the failure, if the occurred failure corresponds to the possible failure, bringing the computer network into an operative protection state corresponding to the determined and dynamically updated protection state.

13 Claims, 3 Drawing Sheets

(51) Int. Cl.
*G06F 11/30* (2006.01)
*H04L 12/26* (2006.01)
*H04L 12/24* (2006.01)
*G06F 11/07* (2006.01)

(52) U.S. Cl.
CPC ........ *G06F11/3006* (2013.01); *G06F 11/3051* (2013.01); *H04L 41/0663* (2013.01); *H04L 41/0672* (2013.01); *H04L 43/0805* (2013.01)

(56) References Cited

U.S. PATENT DOCUMENTS

| | | | |
|---|---|---|---|
| 7,407,108 B1 | 8/2008 | Euler et al. | |
| 7,971,094 B1* | 6/2011 | Benn | G06F 11/2025 |
| | | | 714/11 |
| 8,018,860 B1* | 9/2011 | Cook | H04L 41/145 |
| | | | 370/218 |
| 2004/0042402 A1 | 3/2004 | Galand et al. | |
| 2004/0218525 A1* | 11/2004 | Elie-Dit-Cosaque | H04L 41/0631 |
| | | | 370/223 |

FOREIGN PATENT DOCUMENTS

| | | |
|---|---|---|
| EP | 1931113 | 6/2008 |
| JP | H06132959 | 5/1994 |
| JP | H11506571 | 6/1999 |
| JP | 2001034592 | 2/2001 |
| JP | 2005204317 | 7/2005 |
| JP | 2009100442 | 5/2009 |

\* cited by examiner

PROTECTION AGAINST A FAILURE IN A COMPUTER NETWORK

TECHNICAL FIELD

The present invention generally relates to the field of computer networks. In particular, the present invention relates to the protection of a computer network against a failure.

BACKGROUND ART

As known, a communication network comprises a plurality of nodes connected by paths transporting data flows related to the provision of services to users of the network. Exemplary transmission technologies for communication networks are SDH/Sonet, Ethernet, WDM/DWDM (Wavelength Division Multiplexing/Dense Wavelength Division Multiplexing), IP (Internet Protocol), MPLS (Multi-Protocol Label Switching).

The systems and apparatuses implementing the connectivity between the nodes of the communication network based on any network transmission technology according to protocols belonging to layers 1 to 3 (i.e. from the physical layer to the network layer) of the ISO-OSI protocol stack (e.g. physical links, transmitters, receivers, routers, switches, etc.) are generally referred to as network resources.

The provision of services over a communication network is implemented by using IT (Information Technology) systems and apparatuses, such as computation units (e.g. CPUs), storage units or disks, I/O units, and so on. These systems and apparatuses are typically referred to as IT resources. These IT resources may be co-located with the network resources in the nodes of the communication network or, alternatively, they may be stand-alone systems and apparatuses.

Recovery mechanisms are known for managing a failure affecting a network resource, such as a link of the communication network (e.g. a fiber cut in a WDM network). These mechanisms allow the network to continue operating in the presence of the failure and, in particular, to continue transporting the data flows (and, therefore, to provide the services transported by such data flows) at their respective service level.

EP 1 473 887 discloses a system and method for implementing a shared protection scheme under a scenario of multiple failures in an optical network. In one embodiment of the invention, a working path between an ingress node and an egress node is computed responsive to a connection request received in the network. One or more backup paths are computed between the ingress and egress nodes, which are activatable upon a failure condition associated with the working path or the backup paths. The backup paths may be based on link and/or node disjointedness, as well as resource-based cost constraints.

EP 1 931 113 discloses a network device that load-balances network traffic among a set of network servers based on electrical power consumption of the network servers.

Lai, et al. "RFC3386: Network Hierarchy and multilayer survivability", 7 Nov. 2002, XP002239553, discloses a set of interoperable survivability approaches in packet and non-packet networks.

SUMMARY OF THE INVENTION

Various embodiments provide a method for protecting a computer network against a failure, which allows exploiting the network resources and/or IT resources of the computer network in a very efficient way, while guaranteeing acceptable failure recovery time.

In particular, according to some embodiments, the method provides for precalculating a protection state of the computer network for at least one of the failures which might occur in the network, and dynamically keeping the protection state updated based on the current availability of network resources and/or IT resources in the computer network. Upon occurrence of that failure, the computer network is brought to the pre-calculated and dynamically updated protection state.

This allows efficiently exploiting the network resources, since network resources and/or IT resources involved in the protection state are dynamically allocated only when the failure occurs, being available for further uses for the rest of the time. On the other side, the time needed to recover from the failure is reduced and allows guaranteeing the service level required. Indeed, the protection state is pre-calculated and does not need to be calculated in real-time when the failure occurs.

Furthermore, the method according to embodiments is directly applicable to IT resources cooperating with the network resources, by exploiting duplication/redundancy of IT resources in case of failure.

Moreover, the method according to embodiments is independent of the network technology. Indeed, it is not necessary providing different path recalculation algorithms when different network transmission technologies (e.g. SDH/Sonet, WDM, etc.) are used.

In addition, the method according to some embodiments allows taking into account specific constraints that may be required for the computer network operation at runtime. For instance, a possible specific constraint may be related to the power consumption of the communication network, which may be required not to exceed a certain amount for reducing costs.

In the present description and in the claims, the expression "computer network" will designate a network comprising network resources, IT resources or a combination of network resources and IT resources. Further, in the present description and in the claims, the expression "resource" will indicate either a network resource or an IT resource as defined above.

In a first embodiment, a method for protecting a computer network against a failure comprises:
a) identifying a number of possible failures which might occur within the computer network, the number of possible failures comprising at least one possible failure;
b) based on detected availability of resources in the computer network, determining a protection state of the computer network allowing to circumvent the possible failure and dynamically updating the determined protection state based on changes of the detected availability;
the method further comprising, upon occurrence of the failure:
c) if the occurred failure corresponds to the possible failure, bringing the computer network into an operative protection state corresponding to the determined and dynamically updated protection state.

In some embodiments, the resources comprise network resources and/or information technology resources.

In some embodiments, at step a) the number of possible failures are identified based on topology information on the computer network.

Step b) may further comprise identifying at least one resource whose configuration shall be changed for bringing the computer network into the protection state.

Step b) may further comprise determining a set of configuration parameters of the at least one identified resource.

In some embodiments, the set of configuration parameters is determined based on information on the topology of the computer network.

In some embodiments, step b) comprises:

determining at least two protection states of the computer network allowing to circumvent the possible failure and dynamically updating the determined at least two protection states based on changes of the detected availability; and selecting one of the determined and dynamically updated at least two protection states by taking into account at least one constraint which the computer network shall fulfill.

The at least one constraint may comprise at least one of the following constraints:

constraint on a power consumption of the computer network;

constraint on the at least one resource involved in the selected protection state; and constraint on the time for recovering from the failure possible.

In a second embodiment, a computer program product comprises computer-executable instructions for performing, when the program is run on a computer, the steps of the method as set forth above.

In a third embodiment, a protection manager for a computer network comprises:

a monitoring unit configured to:

identify a number of possible failures which might occur within the computer network, the number of possible failures comprising at least one possible failure;

based on detected availability of resources in the computer network, determine a protection state of the computer network allowing to circumvent the possible failure and dynamically update the determined protection state based on changes of the detected availability;

an actuation unit configured to, if the occurred failure corresponds to the possible failure, bring the computer network into an operative protection state corresponding to the determined and dynamically updated protection state.

In some embodiments, the monitoring unit is further configured to identify at least one resource whose configuration shall be changed for bringing the computer network into the protection state.

The monitoring unit may be further configured to determine a set of configuration parameters of the at least one identified resource.

The protection manager may further comprise a storage unit configured to store the determined and dynamically updated protection state and the determined set of configuration parameters of the at least one identified resource.

In a fourth embodiment, a computer network comprises a protection manager as set forth above.

BRIEF DESCRIPTION OF THE DRAWINGS

Embodiments of the invention will be better understood by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
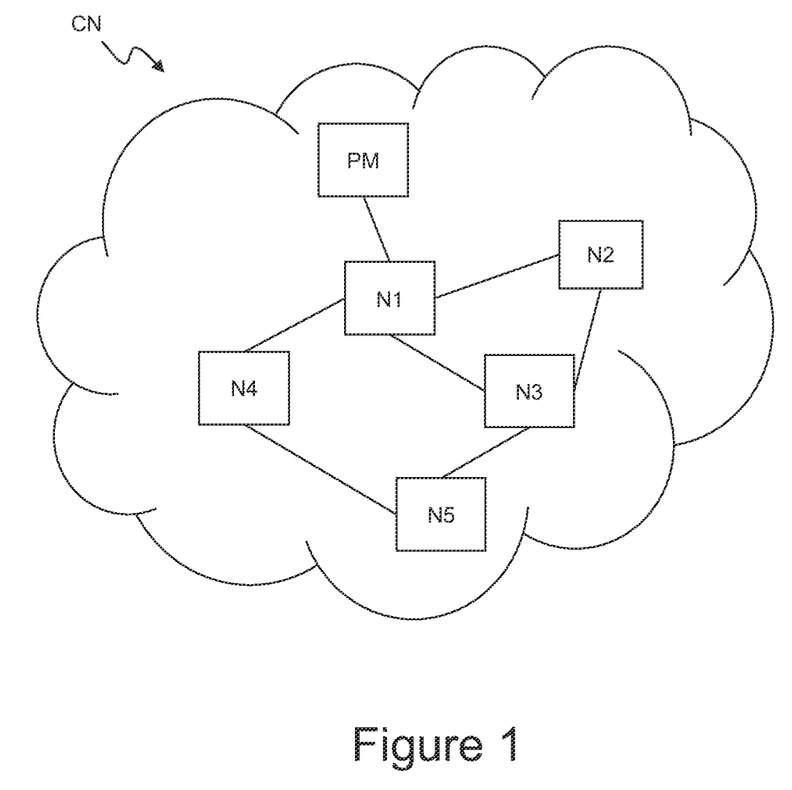
FIG. 1 shows an exemplary communication network.

FIG. 1 schematically shows a communication network CN suitable for implementing the method according to a preferred embodiment of the present invention. This is not limiting. The method which will be described herein after may be applied to any type of computer network, namely to any computer network comprising network resources and/or IT resources. In particular, the method may be applied also to computer networks comprising only IT resources as well as to computer network comprising a combination of network resources and IT resources.

The communication network CN comprises a number of nodes and links interconnecting them. In FIG. 1, for sake of clarity, only five nodes N1, . . . N5 of the communication network CN are shown.

The communication network CN comprises a set of network resources distributed all over the network CN and a set of IT resources distributed at the nodes of the network CN.

In particular, each node N1, . . . N5 may support a single network transmission technology (for instance, it may be an Ethernet switch, an IP router, an SDH node, a WDM node, etc.). Alternatively, each node N1, . . . N5 may comprise different sub-systems, each sub-system being configured to support a different transmission technology. The nodes N1, . . . N5 may be either of a same type (i.e. they may support the same network transmission technology/ies) or they may be of different types (i.e. they may support different network transmission technology/ies).

Figure 2:
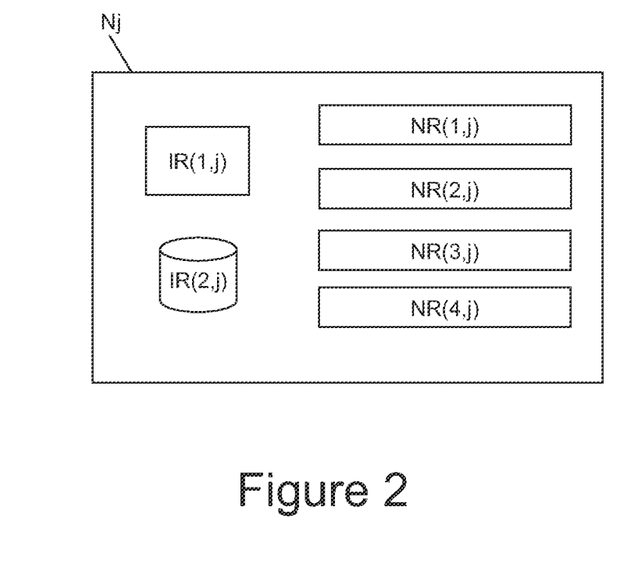
FIG. 2 schematically shows a node of the communication network.

Each node may comprise a set of Rj network resources NR(i, j), i=1, . . . Rj, Rj being an integer number equal to or higher than 1. FIG. 2 schematically shows an exemplary node Nj of the communication network CN comprising four network resources NR(1, j), NR(2, j), NR(3, j) and NR(4, j). Each network resource NR(i, j) comprises a system, sub-system or apparatus configured to implement network transmission technology according to a protocol belonging to any of layers 1 to 3 (i.e. from the physical layer to the network layer) of the ISO-OSI protocol stack.

In particular, each network resource NR(i, j) may comprise a transmission interface terminating a link entering and exiting the node Nj. For instance, the node Nj may support the WDM transmission technology. In this case, each network resource NR(i, j) of the node Nj may comprise an optical transmitter, which in turn comprises a laser, an optical amplifier, a coupler, and so on for transmitting the light along a given fiber connecting the node Nj to a further node of the network.

Moreover, each node may comprise a set of Ij IT resources IR(k, j), k=1, . . . , Ij, Ij being an integer number equal to or higher than 1. Each IT resource IR(k, j) comprises a computation systems or apparatuses such as a computation unit (e.g. a CPU), a storage unit or disks, a I/O unit. In FIG. 2, by way of non limiting example, the exemplary node Nj comprises two IT resources IR(1, j), IR(2, j) (e.g. a CPU and a disk).

The nodes N1, . . . N5 of the communication network CN may comprise only network resources NR(i,j) (Ij=0), only IT resources IR(kJ) (Rj=0) or a combination thereof (both Rj and Ij are different from 0), as shown in FIG. 2.

In operative conditions, the communication network CN connects a plurality of users which exchange data through the nodes N1, . . . , N5 of the network CN. The data exchanged between the network nodes N1, . . . N5 may carry different services, each of them being associated to a respective service level.

The communication network CN may further comprise a protection manager PM. The protection manager PM may be configured to cooperate with all the nodes N1, . . . N5 of the communication network CN.

The protection manager PM may be implemented in a centralized way or in a distributed way. In the former case, the protection manager PM may be implemented as a stand-alone apparatus connected to any one of the nodes N1, . . . N5. Alternatively, the protection manager PM may be integrated within any one of the nodes N1, . . . N5 of the communication network CN. In case of distributed implementation, the protection manager PM may be implemented as a set of stand-alone apparatuses connected to the nodes N1, . . . N5 of the communication network CN. Alternatively, the protection manager PM may be integrated within one or more of the nodes N1, . . . N5 of the communication network CN. By way of non limiting example, the protection manager PM is shown in FIG. 1 as a stand-alone apparatus connected to node N1. Each node N1, . . . N5 of the communication network CN is configured to access the functionalities of the protection manager PM as a service, as it will be described in greater detail herein after.

Figure 3:
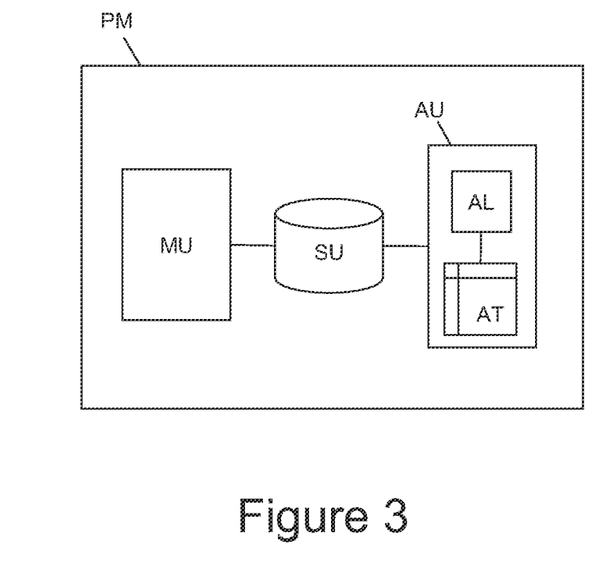
FIG. 3 schematically shows a protection manager of the communication network, according to an embodiment of the present invention.

FIG. 3 schematically shows the block diagram of the protection manager PM according to an embodiment of the present invention. The protection manager PM may comprise a monitoring unit MU, a storage unit SU and an actuation unit AU.

The monitoring unit MU and the actuation unit AU are configured to access the storage unit SU for writing and/or reading information. Both the monitoring unit MU and the actuation unit AU may be implemented by means of respective dedicated programs (stored in a program storage device) components or by means of hardware components capable of executing a software, in combination with a dedicated program (stored in a program storage device).

The operation of the protection manager PM (and, in particular, the monitoring unit MU) will be now described in detail with reference to the flow charts of FIGS. 4 and 5.

Figure 4:
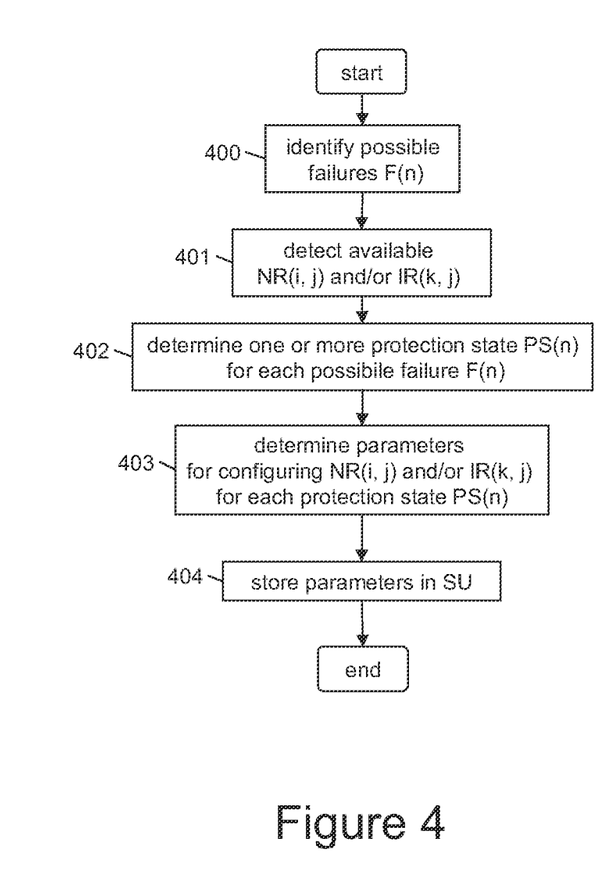
FIG. 4 is a first flow chart illustrating the operation of the protection manager.

With reference to FIG. 4, the monitoring unit MU firstly may identify a set of possible failures F(n) which might occur within the communication network CN (step 400). This set of possible failures F(n) may be provided to the monitoring unit MU by the network operator (through the craft terminal). Alternatively, the set of possible failures F(n) may be automatically identified by the monitoring unit MU on the basis of information indicative of the topology of the communication network CN, which the monitoring unit MU may acquire through an auto-learning mechanism using a suitable control plane protocol. The monitoring unit MU may also monitor the availability of the network resources NR(i, j) and/or the IT resources IR(k, j) of the communication network CN (step 401). In particular, the monitoring unit MU may determine which of the network resources NR(i, j) and/or the IT resources IR(k, j) of the nodes of the communication network CN are currently available, namely are currently unused.

Then, the monitoring unit MU determines, for any possible failure F(n) identified at step 400, one or more configurations (also termed herein after "protection states") PS(n) in which the communication network CN may be brought for circumventing the failure F(n) (step 402). Each protection state PS(n) basically is a "picture" of the communication network CN as it shall be operated in order to circumvent the failure. In other words, each protection state PS(n) comprises a description of the operational status in which the network resources NR(i, j) and/or the IT resources IR(k, j) shall be brought for circumventing the failure.

The operation of determining the protection states PS(n) may be based on the availability of the network resources NR(i, j) and/or the IT resources IR(k, j) as determined at step 401.

The determination as performed by the monitoring unit MU at step 402 may take into account a general objective that the protection manager PM shall pursue. The general objective that the protection manager PM shall pursue depends on whether the protection manager PM shall provide protection for the network resources NR(i, j) only, for the IT resources IR(k, j) only or for the combination of the network resources and the IT resources NR(i, j), IR(k, j). In this latter case, the objective which the protection manager PM shall pursue may be protecting a service transported by the communication network CN, whose provision relies on usage of both network resources NR(i, j) and IT resources IR(k, j) (e.g. a storage unit storing information useful to provide the service), while guaranteeing a certain service level.

For each possible failure F(n), the monitoring unit MU may determine more than one alternative protection state PS(n) which may be implemented with the currently available network resources NR(i, j) and/or IT resources IR(k, j) and which allows achieving the general objective. For example, considering a possible failure F(n) affecting the link between node N1 and node N3 of the communication network CN, the monitoring unit MU may determine two alternative protection states PS(n). In a first protection state, the traffic between N1 and N3 carried by the failed link is switched to a first protection path passing through the node N2. In a second protection state, the traffic between N1 and N3 carried by the failed link is switched to a second protection path passing through the nodes N4 and N5.

In this case, the monitoring unit MU may optionally select one of said alternative protection states PS(n) by taking into account one or more specific constraints which the communication network CN shall fulfil in case of failure. The one or more optional specific constraints may be selected amongst the following ones:

constraint on the power consumed by the communication network CN, i.e. the protection state PS(n) shall guarantee the minimum power consumption of the communication network CN;

constraint on the network resources NR(i, j) and/or IT resources IR(k, j) involved in the protection state PS(n) (e.g. the protection paths activated in the protection state PS(n) shall comprise the links with minimum length); and constraint on the time for recovering from the failure F(n), i.e. the protection state PS(n) shall guarantee the minimum time for recovering from the failure F(n).

For instance, with reference to the above exemplary alternative protection states PS(n) in the communication network CN, the monitoring unit MU may select the first protection state as being the protection state which minimizes the power consumption of the network (since its implementation involves the minimum number of nodes).

The monitoring unit MU may receive the general objective that it shall pursue and the one or more optional specific constraints which the communication network CN shall fulfil in case of failure from a network operator, which may input them by means e.g. of a craft terminal cooperating with the protection manager PM.

Then the monitoring unit MU, for each determined protection state PS(n) (or for each selected protection state PS(n), if a specific constraint has been applied), may identify the network resources NR(i, j) and/or the IT resources IR(k, j) whose configuration shall be changed for bringing the communication network CN into the protection state PS(n) and, for each identified network resource NR(i, j) and/or IT resource IR(k, j), it determines a set of configuration parameters which shall be applied to the resource for configuring that resource for bringing the communication network CN into the protection state PS(n) (step 403).

The configuration parameters may be determined (e.g. by means of numerical simulations and/or experimental measurements) and provided to the monitoring unit MU by the network operator through the craft terminal.

Alternatively, the configuration parameters may be determined by the monitoring unit MU itself on the basis of information indicative of the topology of the communication network CN, which the monitoring unit MU may acquire through the auto-learning mechanism cited above.

For instance, with reference to the above example of possible failure F(n) of the link between nodes N1 and N3, if the protection state PS(n) associated to this failure F(n) provides for activation of a protection path passing through node N2, the monitoring unit MU identifies that node N1, node N2 and node N3 shall change their configuration in order to bring the communication network CN in the protection state PS(n). Assuming that the communication network CN is a WDM network, the monitoring unit MU determines that the optical transmitter of the node N1 towards the node N3 should be switched off, that the optical transmitter of the node N1 towards the node N2 should be switched on and that the optical transmitter of the node N2 towards the node N3 should be switched on. Further, for the optical transmitters to be switched on, the monitoring unit MU determines the laser calibration parameters (output power, phase, gain, etc.).

Then, the monitoring unit MU stores in the storage unit SU the possible failures F(n) identified at step 400 with the respective protection states PS(n) determined at step 402 and the respective set of configuration parameters determined at step 403 (step 404). These data may be stored for instance in the form of a table.

Steps 401-404 are performed in a substantially continuous way. In the present description and in the claims, the expression "substantially continuous way" indicates that steps 401-404 are performed in a continuous, asynchronous way (namely, the monitoring unit MU is permanently listening for possible changes of the resource availability and, upon detection of a change, performs steps 402-404) or in a periodic, synchronous way (namely, the monitoring unit MU periodically checks for possible changes of the resource availability and, upon detection of a change, performs steps 402-404).

This allows the monitoring unit MU to constantly update its knowledge of the availability of the resources NR(i, j), IR(k, j) in the communication network CN and to accordingly update the protection states PS(n) and the relevant configuration parameters. In other words, the protection states PS(n) determined by the monitoring unit MU and stored in the storage unit SU dynamically take into account possible changes in the availability of resources NR(i, j), IR(k, j) in the communication network.

Figure 5:
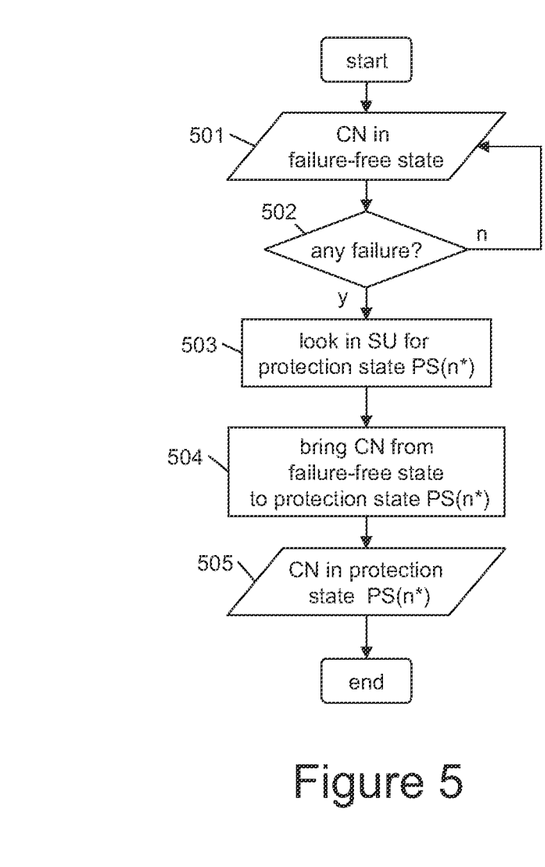
FIG. 5 is a second flow chart illustrating the operation of the protection manager.

With reference now to the flow chart of FIG. 5, it is firstly assumed that communication network CN is operating in a failure-free state (state 501).

Upon detection of a failure F(n*) occurring in the communication network (step 502), the monitoring unit MU may identify an operative protection state PS(n*) corresponding to the detected failure F(n*) (step 503). At step 502, the failure F(n*) may be detected by detecting an alarm message containing information indicative of the failure F(n*) (e.g. resource affected by the failure, failure type, etc.). At step 503, the monitoring unit MU may use the information contained in the alarm message for looking through the storage unit SU and selecting, amongst the protection states PS(n) stored therein, an operative protection state PS(n*) corresponding to the failure F(n*) described by such information.

Then, the actuation unit AU may bring the communication network CN from the failure-free state to the determined operative protection state PS(n*) (step 504).

To this purpose, the actuation unit AU may comprise an actuation table AT and an actuation logic AL. The actuation table AT may store, for each possible type of failure (e.g. fiber cut, disk failure, etc.), a respective set of actions suitable to be taken upon the network resources NR(i, j) and/or the IT resources IR(k, j) to circumvent the failure. At step 504, the actuation logic AL receives from the monitoring unit MU an indication of the type of failure and information allowing it to retrieve from the storage unit SU the configuration parameters associated to the operative protection state PS(n*) to which the communication network CN shall be brought.

Then, the actuation logic AL, on the basis of the information received from the monitoring unit (MU), retrieves the configuration parameters from the storage unit SU and applies the set of actions stored in the actuation table AT for that failure type to the retrieved configuration parameters. For executing the set of actions, the actuation logic AL substantially sends to the involved nodes suitable signaling messages or management messages containing instructions which, when executed by the nodes, reconfigure the involved network resources NR(i, j) and/or IT resources IR(k, j), thereby bringing the communication network CN to the operative protection state PS(n*) (state 505).

Upon implementation of the operative protection state PS(n*), some of the resources previously available in the communication network become unavailable. Since the monitoring unit MU constantly updates its knowledge of the availability of the resources NR(i, j), IR(k, j) in the communication network CN (namely, it substantially continuously performs step 401), the monitoring unit MU becomes aware of the current unavailability of such resources and takes it into account for updating the protection states PS(n) accordingly at step 402.

After the failure F(n*) is fixed, the monitoring unit MU may bring again the communication network to the failure-free state, thereby releasing the network resources NR(i, j) and/or IT resources IR(k, j) used for implementing the operative protection state PS(n*). Again, this change in the resource availability is detected by the monitoring unit MU, which accordingly updates the protection states PS(n).

Therefore, advantageously, the above described method allows exploiting the network resources NR(i, j) and/or IT resources IR(k, j) of the network CN in a very efficient way and, at the same time, guarantees that the time for recovering from the failure F(n*) is acceptable.

Indeed, the resources NR(i, j), IR(k, j) are dynamically allocated for protection only upon occurrence of a failure (provided they are currently unused when the failure occurs), similarly to the restoration schemes. However, differently from the restoration schemes, the protection states are pre-calculated before occurrence of the failures, together with the configuration parameters allowing implementation of the protection states. Pre-calculated states are constantly updated based on the current resource availability. This results in a very short recovery time after failure, because the protection manager PM, upon occurrence of a failure, merely has to apply the configurations whose parameters have been already determined.

Furthermore, the above method is applicable not only to network resources NR(i, j), but also to IT resources IR(k, j) or to the combination of network resources and IT resources NR(i, j), IR(k, j). For instance, in case the method is applied to a computer network comprising an IT resources such as a disk storing certain data, such disk being connected to other network apparatuses through a link, in case of a failure affecting the link, two alternative protection states may be envisaged. In a first state, a further path or link allowing to reach that disk may be activated. In a second state, a further disk may be provided, storing the same data. The monitoring unit MU may select any of such alternative protection states, depending on the resource availability and on possible constraints.

Further, the above described method may be applied to any computer network, independently of its network technology. Indeed, the protection manager PM is capable of performing proper actions for facing different types of failures, which may affect resources based on different technologies.

Further, the above described method may take into account different general objectives and, optionally, specific constraints that may be required for the communication network operation at runtime.

The functions of the various elements shown in FIGS. 1, 2 and 3 may be provided through the use of dedicated software, dedicated hardware, as well as hardware capable of executing software in association with appropriate software. The functions of the various elements may be provided by a single dedicated processor, by a single shared processor or by a plurality of individual processors, some of which may be shared. Moreover, the elements may comprise, without limitation, a digital signal processor (DSP) hardware, a network processor, an application specific integrated circuit (ASIC), a field programmable gate array (FPGA), a read-only memory (ROM) for storing software, a random access memory (RAM) and a non volatile storage. Other hardware, conventional and/or custom, may also be included.

It should be appreciated by those skilled in the art that any block diagrams herein, as those of FIGS. 1, 2 and 3, represent conceptual views of illustrative circuitry embodying the principles of the invention. Similarly, it will be appreciated that any flow charts, flow diagrams, state transition diagrams, pseudo code, and the like, as that of FIGS. 4 and 5, represent various processes which may be substantially represented in computer readable medium and so executed by a computer or processor, whether or not such computer or processor is explicitly shown.

The invention claimed is:

1. A method for protecting a computer network against a failure, said method comprising:
a) identifying a number of possible failures which might occur within the computer network, said number of possible failures comprising at least one possible failure;
b) based on detected availability of resources in said computer network, determining a protection state of said computer network allowing to circumvent said possible failure and dynamically updating said determined protection state based on changes of said detected availability, said protection state being determined, for said possible failure, from a set of possible protection states, and a selection of said protection state being based on a type of failure, wherein said step b) further comprises:
determining at least two protection states of said computer network allowing to circumvent said possible failure and dynamically updating said determined at least two protection states based on changes of said detected availability; and
selecting one of said determined and dynamically updated at least two protection states by taking into account at least one constraint which said computer network shall fulfill, wherein said at least one constraint comprises at least one of the following constraints:
constraint on a power consumption of the computer network; and
constraint on the time for recovering from said failure possible;
said method further comprising, upon occurrence of said failure:
c) if said occurred failure corresponds to said possible failure, bringing said computer network into an operative protection state corresponding to said determined and dynamically updated protection state.

2. The method according to claim 1, wherein said resources comprise network resources and/or information technology resources.

3. The method according to claim 1, wherein at said step a) said number of possible failures are identified based on topology information on said computer network.

4. The method according to claim 1, wherein said step b) further comprises identifying at least one resource whose configuration shall be changed for bringing said computer network into said protection state.

5. The method according to claim 4, wherein said step b) further comprises determining a set of configuration parameters of said at least one identified resource.

6. The method according to claim 5, wherein said set of configuration parameters is determined based on information on the topology of said computer network.

7. A non-transitory computer readable medium comprising computer-executable instructions for performing steps, comprising;
a) identifying a number of possible failures which might occur within the computer network, said number of possible failures comprising at least one possible failure;
b) based on detected availability of resources in said computer network, determining a protection state of said computer network allowing to circumvent said possible failure and dynamically updating said determined protection state based on changes of said detected availability, said protection state being determined, for said possible failure, from a set of possible protection states, and a selection of said protection state being based on a type of failure, wherein said step b) further comprises:
determining at least two protection states of said computer network allowing to circumvent said possible failure and dynamically updating said determined at least two protection states based on changes of said detected availability; and
selecting one of said determined and dynamically updated at least two protection states by taking into account at least one constraint which said computer network shall fulfill, wherein said at least one constraint comprises at least one of the following constraints:
constraint on a power consumption of the computer network; and constraint on the time for recovering from said failure possible;

said method further comprising, upon occurrence of said failure:

c) if said occurred failure corresponds to said possible failure, bringing said computer network into an operative protection state corresponding to said determined and dynamically updated protection state.

8. A protection manager apparatus for a computer network, said protection manager apparatus comprising:

a processor;

a monitoring unit configured to:
identify a number of possible failures which might occur within the computer network, said number of possible failures comprising at least one possible failure;
based on detected availability of resources in said computer network, determine a protection state of said computer network allowing to circumvent said possible failure and dynamically update said determined protection state based on changes of said detected availability, said protection state being determined, for said possible failure, from a set of possible protection states, and a selection of said protection state being based on a type of failure, said monitoring unit further configured to:
determine at least two protection states of said computer network allowing to circumvent said possible failure and dynamically updating said determined at least two protection states based on changes of said detected availability; and
select one of said determined and dynamically updated at least two protection states by taking into account at least one constraint which said computer network shall fulfill, wherein said at least one constraint comprises at least one of the following constraints:
constraint on a power consumption of the computer network; and
constraint on the time for recovering from said failure possible;

an actuation unit configured to, if said occurred failure corresponds to said possible failure, bring said computer network into an operative protection state corresponding to said determined and dynamically updated protection state.

9. The protection manager apparatus according to claim 8, wherein said monitoring unit is further configured to identify at least one resource whose configuration shall be changed for bringing said computer network into said protection state.

10. The protection manager apparatus according to claim 9, wherein said monitoring unit is further configured to determine a set of configuration parameters of said at least one identified resource.

11. The protection manager apparatus according to claim 10, wherein it further comprises a storage unit configured to store said determined and dynamically updated protection state and said determined set of configuration parameters of said at least one identified resource.

12. A computer network comprising a protection manager apparatus according to claim 8.

13. The method according to claim 4, wherein another of said at least one constraint comprises a constraint on said at least one resource involved in said selected protection state.

* * * * *